Sept. 8, 1931.  C. C. ROTHMAN  1,822,749

SILENT CHAIN

Filed Dec. 6, 1928

Inventor:
Charlie C Rothman,
by his Attorneys,
Howson & Howson.

Patented Sept. 8, 1931

1,822,749

UNITED STATES PATENT OFFICE

CHARLIE CARL ROTHMAN, OF INDIANAPOLIS, INDIANA, ASSIGNOR TO LINK-BELT COMPANY, OF CHICAGO, ILLINOIS, A CORPORATION OF ILLINOIS

SILENT CHAIN

Application filed December 6, 1928. Serial No. 324,253.

This invention relates to improvements in silent chain construction, and more particularly to improvements in the articulating joints by which the links are united.

The principal object of the invention is to provide a novel articulating joint having desirable features of simplicity and durability and which shall render the chain relatively quiet in operation.

A further object of the invention is the provision of a truly flexible joint which shall at the same time be free from backlash or looseness, thus making the chain adaptable to widely varying operating conditions.

The invention will be more readily understood by reference to the accompanying drawings, in which.

Figure 1:
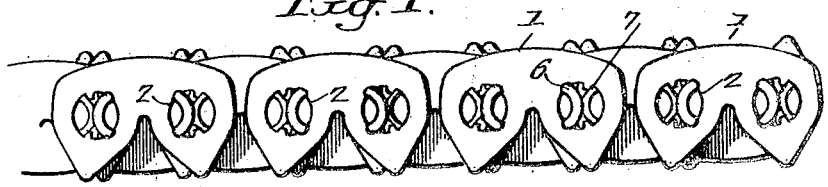
Figure 1 is a fragmentary side elevation showing a portion of a chain made in accordance with my invention.
Figure 2:
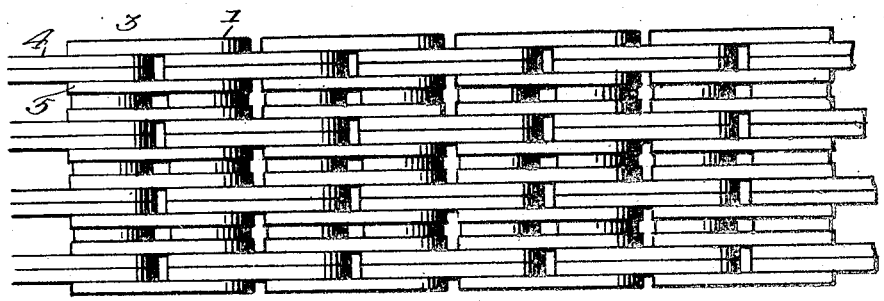
Fig. 2 is a plan view of the chain.
Figure 3:
Fig. 3 is a view in perspective of one of the links.
Figure 4:
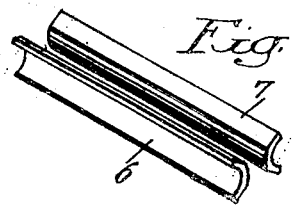
Fig. 4 is a perspective view showing the two elements which constitute each of the pintle pins.

With reference to the drawings, the chain comprises a plurality of links 1 of well known form, each link having at each end a pitch hole 2 and the links being arranged in a plurality of transverse rows or pitches, such as those designated by the reference numerals 3, 4 and 5, with the ends of the links of one pitch overlapping the corresponding ends of the adjacent series so that the said pitch holes are in alignment. The links of each pitch are joined to the links of the adjacent pitch by means of a pair of substantially segmental pin elements 6 and 7 which are passed through the aligned pitch holes 2 of the overlapping links, with their convex sides toward each other, as clearly illustrated in the drawings. These segmental joint members are held in proper relationship to each other and to the links by lugs 8 projecting from the edges of the pitch holes of the links, and these lugs are so arranged in the pitch holes as to provide in one series of links abutments for the edges of the segmental joint members and in the adjacent series of links clearance for articulation around the joint member of the adjacent pitch.

Figure 5:
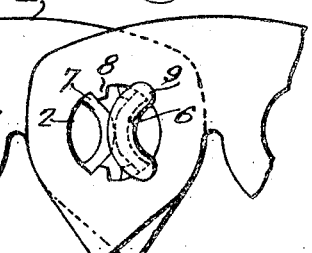
Fig. 5 is an enlarged fragmenary elevation, partly in section, illustrating the details of the device.

The joint members 6 and 7 may be retained in position longitudinally in the links by any suitable means, such for example as by making one member of each joint longer than the other and riveting over the end of the longer so that the upset end portions thereof not only overlie and project beyond the edge of the pitch hole, but also overlie the end of the associated joint member. This is clearly shown in Fig. 5 in which the upset or riveted over end of one of the members is indicated by the reference numeral 9.

The aforedescribed device has been found a particularly desirable one not only by reason of the modified rolling action between the associated joint members, but also by reason of the elasticity in the chain which this joint affords. In operation when articulation takes place the convex surfaces of the joint members roll upon each other and the line of contact of these surfaces provides the instantaneous centers of rotation of the adjacent pitch links. The stress in the chain is transferred from one pitch of links to the adjacent pitch by pressure on the convex sides of the joint members, and by reason of the fact that the major portions of the concave sides of the joint members are unsupported the arch of the segments is permitted to flatten slightly under load and shock to an extent determinable by cross sectional dimensions of the segments.

Figure 6:
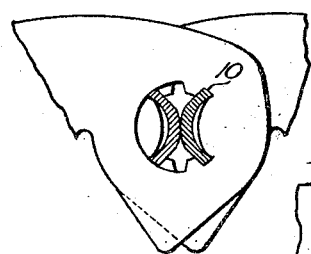
Figs. 6, 7, 8 and 9, are, respectively, fragmentary sectional elevations showing modifications within the scope of the invention.
Figure 8:
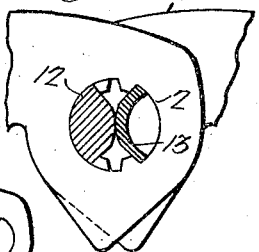
Figure 7:
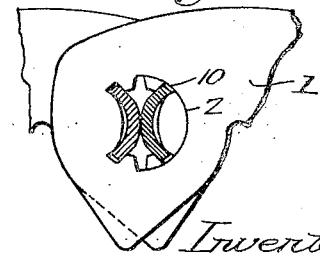

There may be considerable modification within the scope of the invention. It will be noticed for example that in Fig. 6 the pitch holes of the links are so formed as to provide recesses 10 into which the edges of the segmental joint members fit. In Fig. 6 the edges of the segmental members abut the bottoms of these recesses 10, whereas in Fig. 7 a slight clearance is left at the edges of the segmental members permitting a slight play or self-adjustment of these members in the pitch holes of the links. Also as shown in Fig. 8, it is not necessary to a practice of the invention to have both of the joint members in the segmental form, and one of these may be solid, as indicated at 12 without departure from the invention. This arrangement provides the same rolling action between the elements, and the elasticity is provided by the flattening of the companion segmental element 13.

Figure 9:
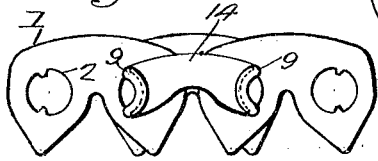

In Fig. 9 I have illustrated a modification of the means for fixing the joint members longitudinally in the links. In this instance a washer 14 is provided having ends shaped to fit the backs of the long members and adapted for insertion between the joint members of each alternate pitch. The length of the washer is such that it fits snugly and tends to push the engaged members apart. The latter members are then riveted over the washer which secures the parts in position. Obviously individual perforated washers for each of the joints might also be used.

Silent chain constructed with joints designed in accordance with this invention operates with marked quietness. The joints quickly absorb the periodic vibrations originating at the point of contact of chain links and sprocket teeth, and prevent transmission of sound through the chain. This in turn prevents the augmenting of the original contact sounds, by substantially eliminating resonance in the free strand of chain between sprockets. The flexible joint further cushions all longitudinal components of shock and impact forces which the chain may receive, materially reducing the destructive effect of these forces.

I claim:

1. An articulating joint for the links of power chains, which comprises a pair of pin elements each having a convex side and adapted for mounting in the links so that the chain stresses are transferred from one adjacent link to another by pressure on said convex sides, at least one of said elements being segmental in form and being mounted in the links with a substantial portion of the concave side unsupported whereby the arch of the segment is permitted to flex inwardly under load and shock.

2. An articulating joint for the links of power chains, which comprises a segmental pin element mounted in the links so that the chain stresses are transferred from one adjacent link to another by pressure on the convex side of said element, said element having a substantial portion of the concave side unsupported whereby the arch of the segment is permitted to depress under load and shock.

3. An articulating joint for the links of power chains, which comprises a segmental pin element mounted in the links so that the longitudinal edges thereof may bear against one of said links and so that the chain stresses are transferred to an adjacent link by pressure on the convex side of the element, said element having a substantial portion of the concave side thereof unsupported whereby the arch of the segment is permitted to depress under load and shock.

4. An articulating joint for the links of power chains, which comprises a pair of segmental pin elements mounted in the link so that the chain stresses are transferred from link to link by pressure on the convex sides of said elements, a substantial portion of the concave side of each element being unsupported whereby the arches of the segments are permitted to depress under load and shock.

5. An articulating joint for the links of power chains, which comprises a pair of segmental pin elements mounted in the links with their convex sides in abutment and with a substantial portion of the concave side of each element unsupported, the relation of the elements to the links being such that the chain stresses are transferred from link to link by pressure on the convex sides of said elements, and said elements being flexible whereby the arches of the segments are permitted to depress under load and shock.

6. A power chain comprising perforated links arranged in overlapping relation with the perforations in alignment, a segmental pin element extending through said aligned apertures with its longitudinal edges finding a seat on the edges of the aperture of one link and with its convex side constituting an abutment whereby the stresses in the chain are transferred from the one link to the overlapping link, a substantial portion of the concave side of said element being unsupported whereby the arch of the segment is permitted to depress under load and shock.

7. A silent chain comprising a plurality of sets of apertured links, the links of the adjacent sets overlapping with said apertures in substantial alignment, and articulating joints for said sets of links each comprising a pair of segmental pin elements extending through said apertures with their convex sides in abutment and with a substantial portion of their concave sides unsupported whereby stresses in the chain are transferred from one set of links to the adjacent set by pressure upon the convex sides of said elements and whereby the arches of said segments are adapted to depress under load and shock.

8. In a silent chain, the combination of a plurality of sets of apertured links, the links of one set overlapping the links of an adjacent set with the said apertures in alignment, a pair of segmental pintle pins extending through said apertures with their convex sides in abutment and with a substantial portion of their concave sides unsupported, and means in each of said sets of links for retaining one of the respective segmental pins relatively fixed therein while affording clearance for the other pin in articulation.

9. A silent chain comprising a plurality of overlapping sets of links having aligned apertures, and articulating pintles mounted in the said aligned apertures, each pintle comprising a segmental part so arranged that its longitudinal edges are adapted to engage the edges of the apertures of one set of links and so that its convex face is cooperatively associated with the other set of links whereby the chain stresses are transferred from one set of links to the other by pressure on said convex surface, said segmental element having a substantial portion of said concave side unsupported whereby the arch of the segment is permitted to depress under load and shock.

10. A silent chain comprising a plurality of overlapping sets of links having aligned apertures, and articulating pintles mounted in said apertures each comprising two parts at least one of which is segmental in form and arranged so that its longitudinal edges may engage the edges of said apertures and so that its convex side is cooperatively opposed to the other part, a substantial portion of the concave side of said segmental part being unsupported whereby the arch of the segment is permitted to depress under load and shock.

11. A silent chain comprising a plurality of overlapping sets of links having aligned apertures, and articulating pintles mounted in said apertures and joining said sets of links, each of said pintles comprising a pair of segmental elements with their edges opposed to the edges of said apertures and with their convex surfaces cooperatively opposed, means in one of said sets of links for holding one of the segmental elements relatively fixed while providing clearance for the other element in articulation, and means in the other set of links for retaining the other of said segmental elements relatively fixed therein while affording clearance for the first-named element in articulation, a substantial portion of each of the concave sides of said elements being unsupported whereby the arches of said segments are permitted to depress under load and shock.

12. An articulating joint for silent chains comprising opposed pintle elements having cooperating surfaces adapted in articulation to roll one upon the other, at least one of said elements being resilient in a direction substantially normal to said surfaces at the point of contact.

13. A silent chain comprising a plurality of links arranged end to end in overlapping relation, and articulating joints for said links including opposed pintle elements having cooperating surfaces adapted in articulation to roll one upon the other, at least one of said elements being resilient in a direction substantially normal to said surfaces at the point of contact.

14. A silent chain comprising a plurality of links arranged end to end in overlapping relation, and pintle elements carried by the longitudinally adjacent links having cooperating surfaces adapted to roll one upon the other for articulation, at least one of said elements being resilient in a direction substantially normal to said surfaces at the point of contact.

CHARLIE CARL ROTHMAN.